(12) United States Patent
Pfeifer et al.

(10) Patent No.: US 12,227,980 B2
(45) Date of Patent: Feb. 18, 2025

(54) SPINDLE DRIVE

(71) Applicant: Brose Fahrzeugteile SE & Co. Kommanditgesellschaft, Bamberg, Bamberg (DE)

(72) Inventors: Sebastian Pfeifer, Strullendorf (DE); Michael Schneiderbanger, Rattelsdorf (DE); Frank Hälbig, Bamberg (DE); Uwe Fischer, Sonneberg (DE); Tobias Bosecker, Bad Rodach (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 69 days.

(21) Appl. No.: 17/797,667

(22) PCT Filed: Feb. 2, 2021

(86) PCT No.: PCT/EP2021/052347
§ 371 (c)(1),
(2) Date: Aug. 4, 2022

(87) PCT Pub. No.: WO2021/156217
PCT Pub. Date: Aug. 12, 2021

(65) Prior Publication Data
US 2023/0060788 A1    Mar. 2, 2023

(30) Foreign Application Priority Data

Feb. 5, 2020    (DE) .................... 10 2020 102 846.6

(51) Int. Cl.
*F16H 25/24*    (2006.01)
*B60J 5/10*    (2006.01)
(Continued)

(52) U.S. Cl.
CPC ............. *E05F 15/622* (2015.01); *B60J 5/107* (2013.01); *F16H 25/2015* (2013.01);
(Continued)

(58) Field of Classification Search
CPC ..... F16H 2025/2037; F16H 2025/2031; F16H 2025/2034
See application file for complete search history.

(56) References Cited

U.S. PATENT DOCUMENTS 9,765,809 B2 *    9/2017    Fischer ................ F16J 15/3204
2006/0270330 A1 *    11/2006    Schmid .................... F16C 31/02
452/58

(Continued)

FOREIGN PATENT DOCUMENTS

DE    202008016615 U1    4/2010
DE    102008062391 A1    6/2010
(Continued)

*Primary Examiner* — Gregory Robert Weber
(74) *Attorney, Agent, or Firm* — Dickinson Wright PLLC

(57) ABSTRACT

A spindle drive for an adjustment element of a motor vehicle, including a tubular drive housing having a first housing pipe, a spindle/spindle nut transmission configured to produce linear drive movements, a first drive connection and a second drive connection configured to discharge the drive movements, the first drive connection forms with one of the transmission components a first drive train component and the second drive connection forms with the other of the transmission components a second drive train component. A housing cover axially closing the drive housing and arranged in an axially secure manner relative to the first drive connection. The first housing pipe arranged in an axially secure manner relative to the first drive connection. A housing collar in a first coupling portion of the spindle drive connected to the first housing pipe and in a second coupling portion coupled to the housing cover.

18 Claims, 5 Drawing Sheets

(51) Int. Cl.
*E05F 15/622* (2015.01)
*F16H 25/20* (2006.01)

(52) U.S. Cl.
CPC .......... *F16H 25/24* (2013.01); *E05Y 2201/10* (2013.01); *E05Y 2900/546* (2013.01); *F16H 2025/2031* (2013.01); *F16H 2025/2075* (2013.01)

(56) References Cited

U.S. PATENT DOCUMENTS

2017/0268276 A1* 9/2017 Fischer ................. E05F 15/622
2019/0032389 A1* 1/2019 Oster ..................... F16H 25/24

FOREIGN PATENT DOCUMENTS

| | | |
|---|---|---|
| DE | 102011116559 A1 | 4/2013 |
| DE | 102012018826 A1 | 3/2014 |
| DE | 102016120178 A1 | 4/2018 |
| EP | 2397640 A2 | 12/2011 |
| WO | 2019030039 A1 | 2/2019 |
| WO | 2019105808 A1 | 6/2019 |
| WO | 2020148357 A2 | 7/2020 |

* cited by examiner

SPINDLE DRIVE

CROSS-REFERENCE TO RELATED APPLICATIONS

This application is the U.S. National Phase of PCT Application No. PCT/EP2021/052347 filed on Feb. 2, 2021, which claims priority to German Patent Application No. DE 10 2020 102 846.6, filed on Feb. 5, 2020, the disclosures of which are hereby incorporated in their entirety by reference herein.

TECHNICAL FIELD

The present disclosure relates to a spindle drive for an adjustment element of a motor vehicle.

BACKGROUND

Vehicles may include a spindle drive configured for use in all types of adjustment elements of a motor vehicle. Exemplary adjustment elements are tailgates, boot lids, side doors, bonnets or the like.

SUMMARY

One or more problems addressed by the invention is to configure and develop an improved connection between a housing pipe of the drive housing and the spindle drive.

According to one or more embodiments, the housing pipe which is associated with the drive connection, such as the motor-side drive connection, is not intended to be secured or in any case not exclusively to the housing cover, but instead in addition to the housing cover there is intended to be provided a separate housing collar which connects the housing pipe to the housing cover and consequently to the drive connection. During assembly, in this instance the housing collar, as will be described below, is connected particularly by means of a weld connection, such as an ultrasonic weld connection, in a materially bonded manner to the housing pipe, for example, an outer housing pipe of a multi-component drive housing and a single-piece housing portion is thereby provided.

A housing collar is in this instance a component which in the assembled state, when it is therefore connected to the housing pipe in a materially bonded manner, protrudes at least partially from the housing pipe in a radially inward direction and consequently forms a cross section reduction of the housing component. The axial extent of such a component is particularly in this instance many times, for example, at least five times smaller than the radial extent thereof and may thus be distinguished from a housing cap.

The use of a housing collar has in this instance the advantage that it provides over the portion which forms the cross section reduction a comparatively large axial abutment face for axial abutment against the housing cover. Via this axial abutment face, correspondingly large forces can be absorbed in an axial direction.

In one or more embodiments, as a result of the materially bonded connection, such as the weld connection, between the housing collar and housing pipe at this location a particularly secure connection which enables a transmission of correspondingly large forces in an axial direction is provided. A corresponding connection of the housing pipe to the spindle drive is further thus particularly stable, such as in the event that the housing pipe is axially loaded in a direction away from the housing collar.

By means of ultrasonic welding, the materially bonded connection can be produced in a relatively simple manner. To this end, a sonotrode may be axially placed on the housing collar and, whilst from the axially opposing side, the housing pipe is joined to and is in contact with the housing collar, is caused to carry out a mechanical oscillation in the ultrasound range, such as in the range from 16 to 100 kHz, or in the range from 20 to 50 kHz, or in the range from 20 to 35 kHz. Alternatively, in place of the ultrasonic welding, a laser welding, for example, laser transmission welding, is also conceivable.

In detail, it is proposed that there be provided a housing collar which is connection in a first coupling portion of the spindle drive to the first housing pipe in a materially bonded manner and which in a second coupling portion of the spindle drive is connected to the housing cover in an axially secure manner.

The materially bonded connection may according to another embodiment, be formed by a weld connection, preferably an ultrasonic weld connection. According to an alternative, however, it is in principle also conceivable to provide an adhesive connection for this purpose.

According to another embodiment, the housing collar has at least one receiving space. When a welding operation is carried out, this space receives the pipe end and the resulting melt and thus ensures a materially bonded connection when the melt has hardened. When an adhesive bonding operation has been carried out, the receiving space receives the pipe end and the adhesive which has been introduced and thus ensures a materially bonded connection when the adhesive has hardened.

One or more embodiments relate to an axial end portion of the first housing pipe which is used for materially bonded connection to the housing collar. When a welding operation is carried out, this axial end portion is at least partially molten, whereby the melt which, together with the axial end portion, further at least partially fills the receiving space in the assembled state is formed. When an adhesive bonding operation is carried out, the axial end portion of the first housing pipe is at least partially adhesively bonded in the receiving space. In this instance, the axial end portion preferably extends as far as an axial stop element which is provided on the housing pipe and which can cooperate according to claim 7 with a counter-stop element of the housing collar in such a manner that an axial movement of the first housing pipe relative to the housing collar is blocked in a correct end position. In principle, however, in the assembled state, after the housing pipe and housing collar have been axially joined, an axial gap may also remain between the stop element and counter-stop element.

According to another embodiment, the housing collar may be an annularly circumferential component. The component may in this instance be configured to extend without interruptions, that is to say, to extend as a continuous ring, or with a circumferential interruption. In the case of a circumferential interruption, the housing collar then has for example a substantially horseshoe-like shape.

One or more embodiments relate to a torsion prevention means, that may be provided between the housing collar and the housing cover. This means is for example configured in such a manner that a rotational movement of the housing collar relative to the housing cover is possible neither in one rotation direction nor in the other.

According to another embodiment, the housing collar is a plastic material component. This may be a single-component plastic material component or a multi-component plastic material component. With a multi-component plastic material component, for example a two-component plastic material component, it may be in the case of a radially inner portion a soft component and in the case of a radially outer portion a hard component. A soft component differs from a hard component in that the soft component has a lower hardness and is consequently more resilient than the hard component. Preferably, the first housing pipe is also a plastic material component. In a particularly preferred manner, in the event that two housing pipes are provided, both housing pipes are a plastic material component in each case.

Another embodiment defines melting points of the material of the housing collar and the first housing pipe. As an example, the melting point of the housing collar is equal to or greater than that of the housing pipe. As another example, when a welding operation is carried out, substantially only the housing pipe is molten, which is promoted for example by a cross section of the pipe wall which tapers in the direction towards the pipe end.

One or more embodiments relate to water discharge channels in the housing collar which extend for example from the lower side to the upper side thereof.

According to another embodiment, the first coupling portion and/or the receiving space of the housing collar is radially and/or axially spaced apart from the second coupling portion or adjacent thereto.

Other embodiments describe the connection between the housing collar and the housing cover and the connection between the housing cover and the first drive connection.

The connection between the housing collar and housing cover may be an axially positive-locking and/or axially non-positive-locking connection, for example an axial locking connection. In this instance, it may be the case that the housing collar is first guided over the outer end of the first drive connection, for example a ball socket or a ball head, the housing collar is then axially placed on the housing cover and preferably axially engaged therewith. Preferably, the mentioned housing pipe is then subsequently moved from the axially opposing side, that is to say, from the second drive connection, in the direction of the housing collar and then, in the receiving space of the housing collar, connected thereto in a materially bonded manner, preferably via the weld connection. Particularly in this instance during the welding operation, for example ultrasonic welding operation, the housing pipe is in contact with the housing collar, for example in the receiving space and is molten at the end side. During the melting operation, the housing pipe is moved further in the direction of the housing collar, preferably by at least 0.25 mm, more preferably by at least 0.5 mm, more preferably by at least 0.75 mm. In this manner, after the melt has hardened, the housing pipe is connected to the first drive connection in an axially secure manner.

BRIEF DESCRIPTION OF THE DRAWINGS

The invention is explained in greater detail below with reference to the drawings which merely illustrate embodiments and in which.

DETAILED DESCRIPTION

Figure 1:
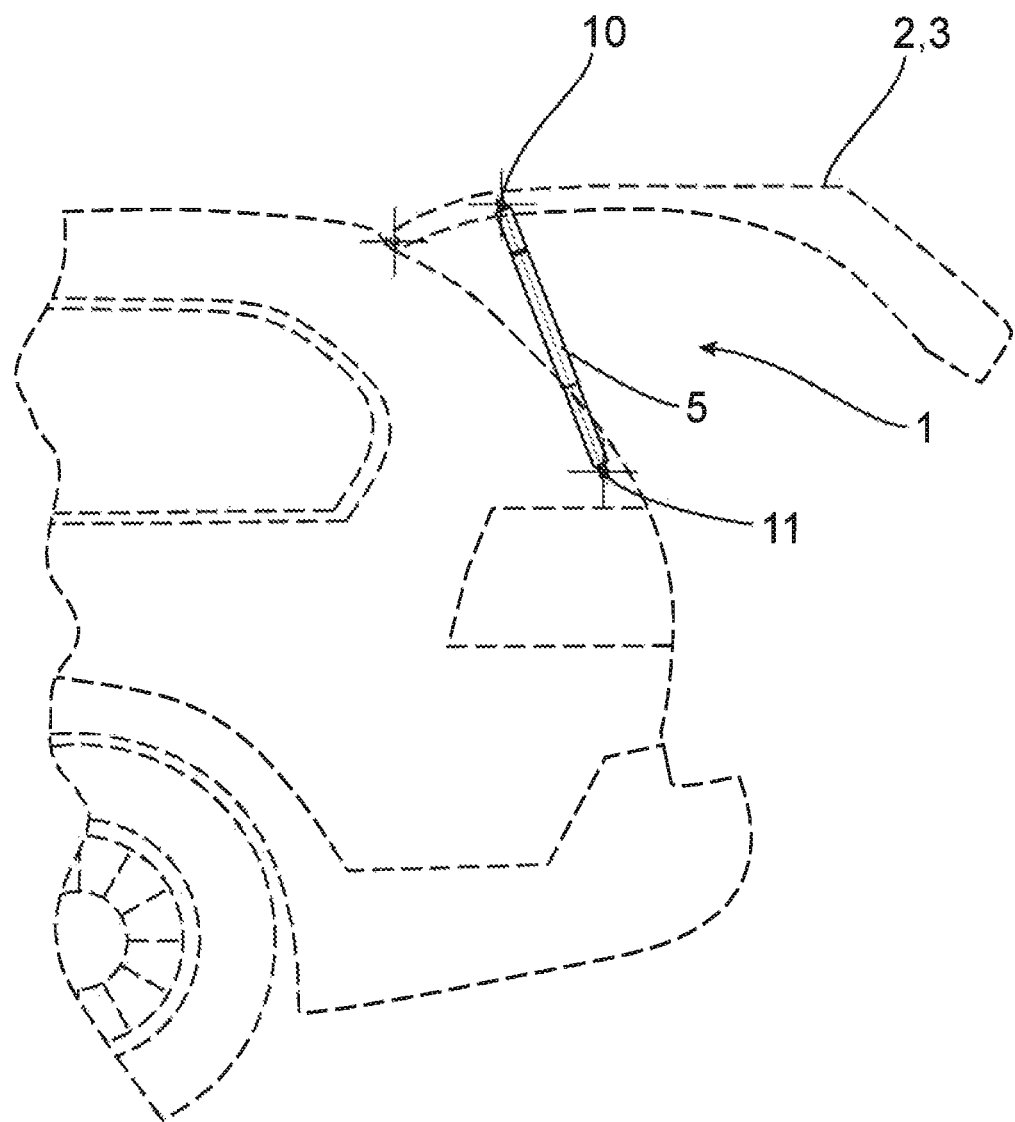
FIG. 1 shows the rear region of a motor vehicle having a spindle drive according to the proposal.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known spindle drive is provided in DE 10 2016 120 178 A1, which sets out a tubular, two-part drive housing having two housing pipes in the form of an outer housing pipe and an inner housing pipe which extends therein in a telescopic manner. Furthermore, two drive connections for discharging drive movements of the spindle drive are provided. The drive housing is provided in the region of each drive connection with a housing cover, which is arranged in an axially secure manner with respect to the drive connection and to which the respective housing pipe is coupled in an axially secure manner. In the drive housing, there is provided a spindle/spindle nut transmission which is arranged downstream of a drive motor in technical driving terms. The drive motor is supported in a motor casing whose axial end facing the respective drive connection is formed by one of the housing covers. The outer housing pipe is axially engaged with this cover in a positive-locking manner by means of a clip-fit connection. The outer housing pipe is consequently also axially secure with respect to the associated drive connection.

The clip-fit connection enables simple assembly of the housing pipe in the region of the associated drive connection. The housing pipe thus needs only to be pushed axially in the direction of the housing cover into the correct end position, in which a locking projection which is provided radially at the outer side on the cover cooperates with a corresponding pipe opening which forms a locking receiving member in an axially positive-locking manner. Such a pipe locking receiving member may in this instance be provided in a resilient, flap-like portion of the housing pipe which can be redirected radially outwards during assembly in order to be able to guide the housing pipe over the locking projection. In the correct end position, the flap-like portion rebounds in the direction of its original position again, whereby the positive-locking connection is produced. The connection between the outer housing pipe and the spindle drive may be further optimized with regard to stability.

The spindle drive 1 shown in the drawings is associated with an adjustment element 2 of a motor vehicle which may be a boot lid 3. All explanations relating to a boot lid 3 also apply in this instance to all other types of adjustment elements 2 of a motor vehicle. In this regard, reference may be made to the exemplary listing in the introductory portion of the description.

The spindle drive 1 is used for adjustment, such as motorised adjustment, of the boot lid 3. To this end, the spindle drive 1 is articulated to the motor vehicle body, on the one hand, and to the boot lid 3, on the other hand, in each case in a state spaced apart from a pivot axis of the boot lid 3. The spindle drive 1 generates linear drive movements along an axially extending geometric drive axis 4 so that the boot lid 3 can be adjusted in a motorized manner between a closed position and the open position illustrated in FIG. 1.

Figure 2:
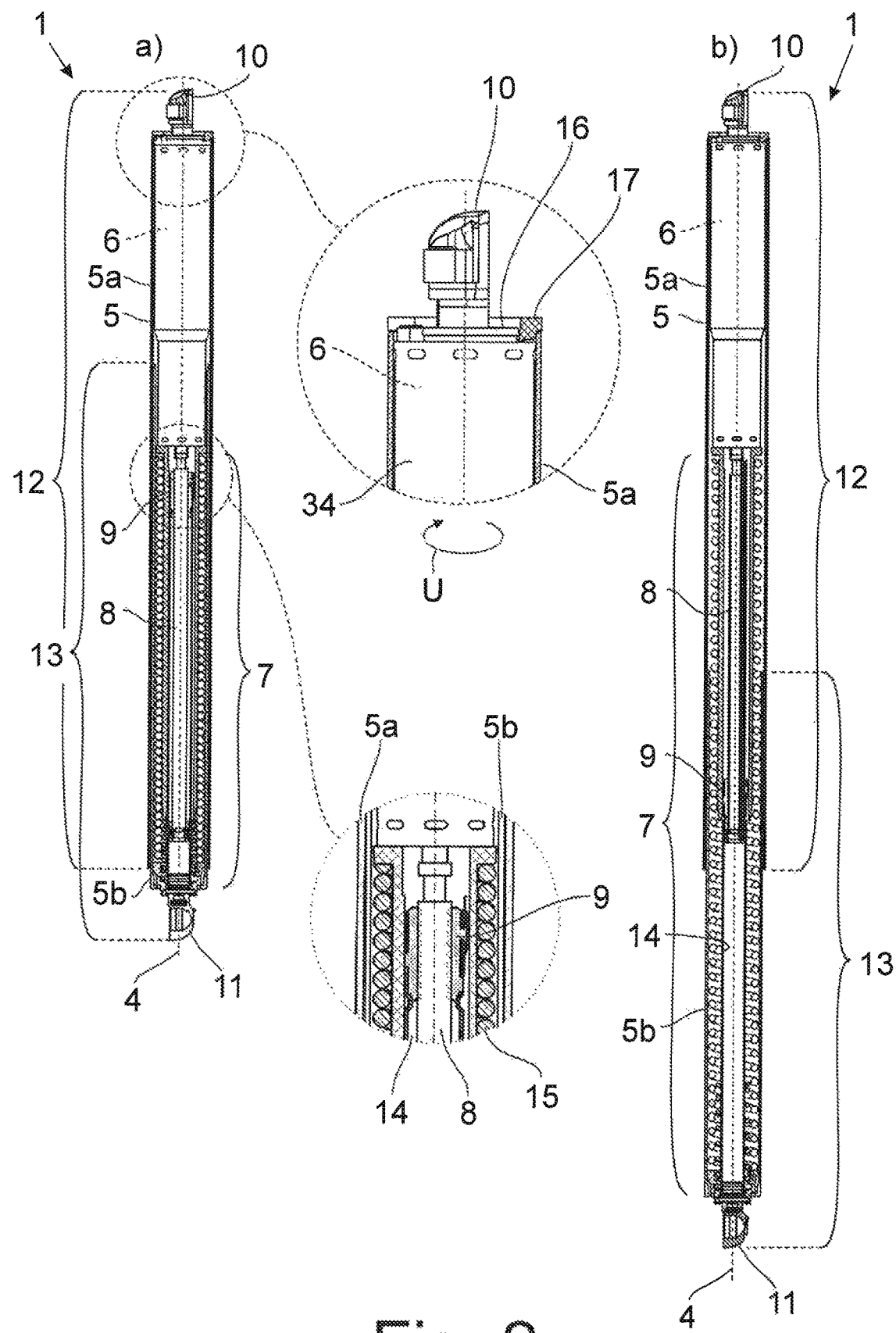
FIG. 2 shows a longitudinal section of the spindle drive according to FIG. 1 a) in the retracted state and b) in the extended state.

FIGS. 1 and 2 show that the spindle drive 1 has a tubular drive housing 5 having at least a first housing pipe 5a, in this instance two housing pipes 5a, 5b. The first housing pipe 5a can in principle in an alternative embodiment which is not illustrated here also be the single housing pipe. In this case and preferably, there are provided as housing pipes an outer housing pipe 5a and an inner housing pipe 5b which during an adjustment of the spindle drive 1 between an extended position and a retracted position extend one inside the other in the manner of a telescope. As an example, the outer housing pipe 5a forms the first housing pipe mentioned. In an alternative embodiment which is not illustrated in this instance, however, the inner housing pipe 5b may also form the first housing pipe mentioned.

As an example, in the drive housing 5 along the drive axis 4 there are provided one behind the other a drive motor 6 and, in order to produce the linear drive movements, a spindle/spindle nut transmission 7 which is arranged downstream of the drive motor 6. Between the drive motor 6 and the spindle/spindle nut transmission 7, an intermediate transmission may be provided where applicable. In this instance, the drive motor 6 drives a spindle 8 as a transmission component of the spindle/spindle nut transmission 7 so that a spindle nut 9 which is in meshing engagement therewith carries out an axial movement as an additional transmission component of the spindle/spindle nut transmission 7 which is supported in a rotationally secure but axially movable manner in the spindle drive 1.

In order to discharge the drive movements, there are provided a first drive connection 10 and a second drive connection 11 which are arranged for example on the drive axle 4.

The first drive connection 10 forms with one of the transmission components, in this instance the spindle 8, a first drive train component 12. The drive motor 6 is also a component of the first drive train component 12. The first drive connection 10 is in this instance arranged at the motor side of the spindle drive 1. The first housing pipe 5a is in this instance arranged in an axially secure manner relative to the first drive connection 10. The term "axially secure" means that the two elements which are axially secure with respect to each other, in this instance the first housing pipe 5a and the first drive connection 10, are non-movable relative to each other in both axial directions.

The second drive connection 11 forms with the other one of the transmission components, in this instance the spindle nut 9, a second drive train component 13. A spindle nut pipe 14, which in this instance forms a guiding pipe for guiding the spindle 8, connects in this instance the spindle nut 9 in an axially secure and rotationally secure manner to the second drive connection 11 and is also a component of the second drive train component 13. The second drive connection 11 is in this instance arranged at the side of the spindle drive 1 facing away from the motor, that is to say, at the output side.

In the drive housing 5 there is, for example, further arranged a helical spring 15, in this case a helical compression spring, which pretensions the two drive connections 10, 11 away from each other, that is to say, into the extended position of the spindle drive 1.

As an example, both drive connections 10, 11 are provided with a ball socket. In place of the ball socket, the respective drive connection 10, 11 may also be provided with a ball head or another connection element. The ball socket of the first drive connection 10 is connected in an axially secure and for example rotationally secure manner to a housing cover 16 which axially closes the drive housing 5. In this case, the spindle 8 is, in this instance via the drive motor 6, supported so as to be axially secure and rotatable relative to the housing cover 16. The ball socket of the second drive connection 11 is connected to the spindle nut pipe 14 in an axially secure and for example rotationally secure manner.

Up to this point, the structure of the spindle drive 1 according to the proposal corresponds to the structure of the spindle drive set out in DE 10 2016 120 178 A1 which is from the same Applicant and the content of which is incorporated in the present application by reference in this regard.

It is significant for the solution according to the proposal that there is provided a housing collar 17 which in a first coupling portion 18 of the spindle drive 1 is connected to the first housing pipe 5a in a materially bonded manner and which in a second coupling portion 20 of the spindle drive 1 is coupled to the housing cover 16 in an axially secure manner. The coupling portions 18, 20 are in this instance preferably radially and/or axially spaced apart from each other or axially adjacent to each other but may also axially overlap.

As an example, the housing collar 17 is in the first coupling portion 18 of the spindle drive 1 connected to the first housing pipe 5a in a materially bonded manner by means of a weld connection 19, preferably an ultrasonic weld connection. A weld connection 19 may in principle also be produced by means of laser welding, for example laser transmission welding. As an alternative to a weld collection, an adhesive connection is also conceivable. Otherwise, however, the ultrasonic welding should be the main type.

As mentioned, in the second coupling portion 20 of the spindle drive 1, the housing collar 17 is coupled to the housing cover 16 in an axially secure manner. The term "coupled in an axially secure manner" means in this instance that the housing collar 17 and the housing cover 16 are connected to each other in such a manner that, as a result of this shape of the connection, a relative movement between the housing collar 17 and housing cover 16 is possible neither in one axial direction nor in the other axial direction.

Figure 3:
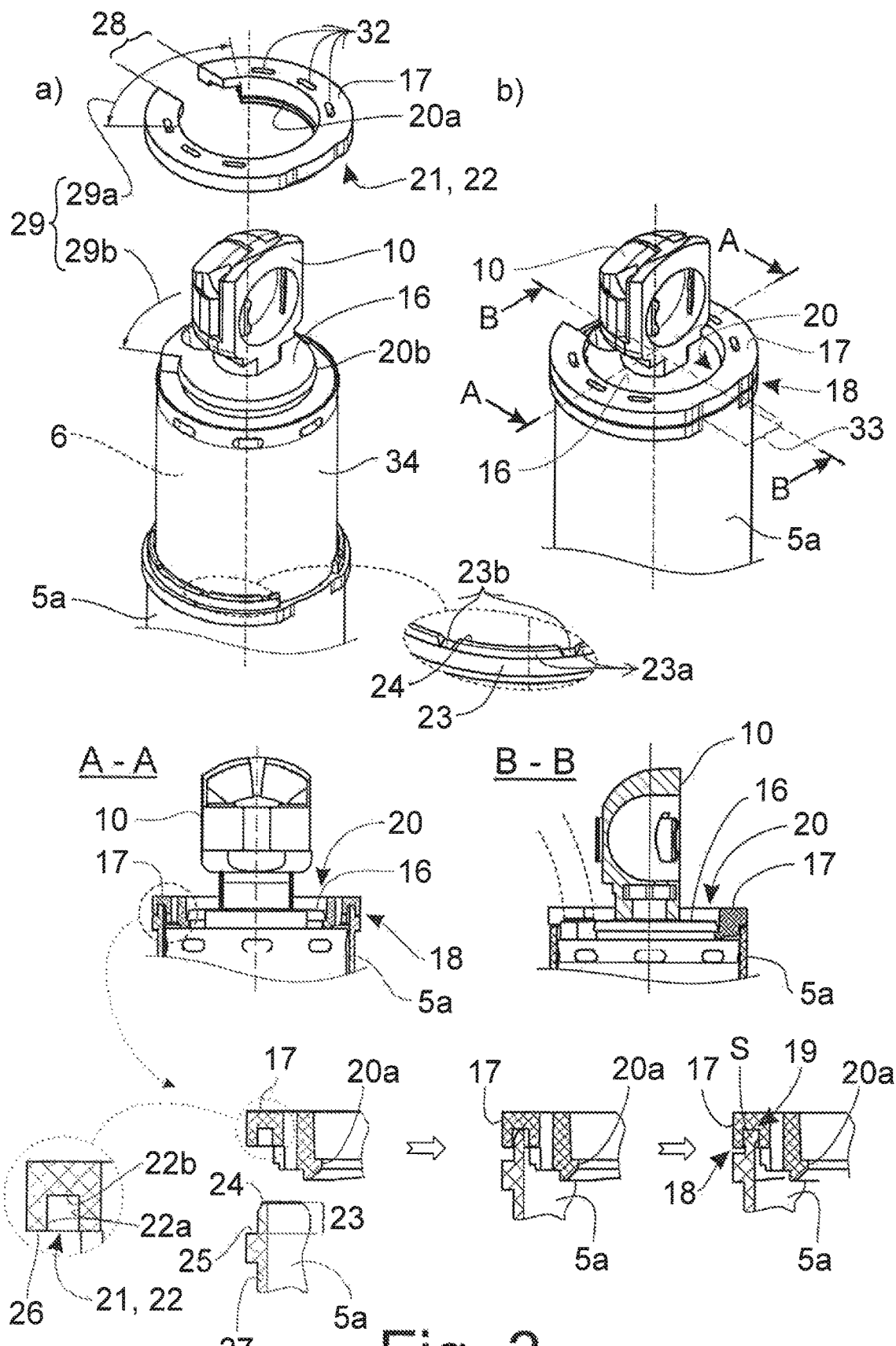
FIG. 3 shows individual detailed views of a spindle drive according to the proposal according to a first embodiment a) during assembly and b) after assembly.

In the first coupling portion 18 of the spindle drive 1, the housing collar 17 has, for example, at least one receiving space 21, for example at least one and here precisely one circumferentially groove-like receiving space 21 which is illustrated to an enlarged scale at the bottom left in FIG. 3. This receiving space 21 serves in this instance to receive melt S of the first housing pipe 5a, which melt is produced during the assembly by means of a welding operation, in this instance an ultrasonic welding operation. Alternatively, this receiving space 21 serves to receive adhesive which has been introduced during the assembly by means of an adhesive bonding operation.

As an example, the receiving space 21 is formed by an axial recess 22, for example a groove, at the side of the housing collar 17 facing the first housing pipe 5a. The axial recess 22 which forms the receiving space 21 has, as illustrated to an enlarged scale at the bottom left in FIG. 3, at least one inner wall 22a, in this instance two inner walls 22a which are radially opposite each other, and a base 22b.

As an example, it is the case that at least one inner wall 22a, in this instance both inner walls 22a, and/or the base 22b is/are connected in a materially bonded manner to an axial end portion 23 of the first housing pipe 5a, which is formed by means of hardened melt S which has been produced during assembly by the welding operation. The inner walls 22a have in this instance, in cross section, an axial extent and the base 22b has a radial extent. In the case which is not illustrated here, but which is also conceivable, that instead of the welding operation an adhesive operation is provided, it is then accordingly the case that at least one inner wall 22a, for example both inner walls 22a and/or the base 22b, is/are adhesively bonded to an axial end portion 23 of the first housing pipe 5a.

At the bottom right in FIG. 3, it can be seen that the axial end portion 23 of the first housing pipe 5a during assembly is at least partially molten by the welding operation and forms the melt S which then at least partially fills the receiving space 21 in the mounted state. In the case which is not illustrated in this instance, but which is also conceivable, that instead of the welding operation an adhesive bonding operation is provided, it is then accordingly the case that the axial end portion 23 of the first housing pipe 5a during assembly is at least partially adhesively bonded in the receiving space 21 by the adhesive bonding operation, wherein the adhesive in the assembled state at least partially fills the receiving space 21.

As an example, the axial end portion 23 extends from the pipe end 24 facing away from the second drive connection 11 to an axial stop element 25, in this instance in the form of a partially or completely circumferential, radially external projection. Alternatively, it may also be a partially or completely circumferential, radially internal projection. The term "completely circumferential" means in this instance that the stop element 25 or the projection extends in an uninterrupted manner over the entire circumference of the housing pipe 5a. The term "partially circumferential" means that, along the circumference of the housing pipe 5a, at least one region 33 without a radial projection is provided, as illustrated for example in FIG. 3b). In the region 33 of the circumference, the housing collar 17 is further radially flattened in this case. The drive housing 5 or the spindle drive 1 thereby has in a radial direction a reduced width which saves structural space. Even more structural space can be saved if such a region 33 is provided at two opposing sides of the drive housing 5 or spindle drive 1, as illustrated by the section B-B in FIG. 3.

The stop element 25 of the first housing pipe 5a can for example cooperate with a counter-stop element 26 of the housing collar 17 in such a manner that an axial movement of the first housing pipe 5a relative to the housing collar 17 is blocked in a correct end position. In principle, however, in the assembled state an axial gap may remain between the stop element 25 and counter-stop element 26, as shown in FIG. 3 at the bottom right.

FIG. 3 also shows in the lower illustration of the assembly operation and in the enlarged detail of FIG. 3a) that, for example, in the axial end portion 23 the cross section of the pipe wall 27 of the first housing pipe 5a tapers in the unmounted state in the direction towards the pipe end 24. The tapering simplifies the melting of the material of the first housing pipe 5a in this region, for example during ultrasonic welding. It is further the case that the cross section of the pipe wall 27, starting from the axial stop element 25, in the unmounted state towards the pipe end 24, is initially uniform in a region and then tapers. As shown in FIG. 3 at the bottom right, the cross section of the pipe wall 27, starting from the axial stop element 25, in the mounted state towards the pipe end 24, is further initially uniform in a region and then expands in this case. The last effect is a result of the fact that the melt S is distributed in the receiving space 21 and for example also laterally, in this instance at the radially inner side, can flow down at the axial end portion 23. Preferably in this instance, the radial extent of the receiving space 21 in the unmounted state and/or in the mounted state is greater than the radial extent of the pipe wall 27 in the region of the uniform cross section.

In the embodiment according to FIG. 3, the housing collar 17 is an annularly circumferential component which extends in this instance with a circumferential interruption 28 and which for example is coupled in an axially secure manner to the housing cover 16 only when the cover is also already fixed in an axially secure manner to the spindle drive 1. In the embodiment according to FIG. 5, the housing collar 17 is also an annularly circumferential component which extends in this instance with a circumferential interruption 28, wherein the housing collar 17 is, however, already pre-mounted on the housing cover 16 before it is secured, where applicable also configured in one piece therewith. The housing collar 17 in the embodiment according to FIG. 4 is also an annularly circumferential component but in this instance a circumferential component without any interruptions.

Furthermore, for example, a torsion prevention means 29 is provided between the housing collar 17 and the housing cover 16. As an example, as shown in FIG. 3a), the torsion prevention means 29 is formed by a recess 29a in the housing collar 17, for example in the form of an axial recess or a circumferential interruption in the housing collar 17, together with a corresponding counter-piece 29b on the housing cover 16. As an example, the recess 29a at least partially overlaps the interruption 28 axially.

Figure 4:
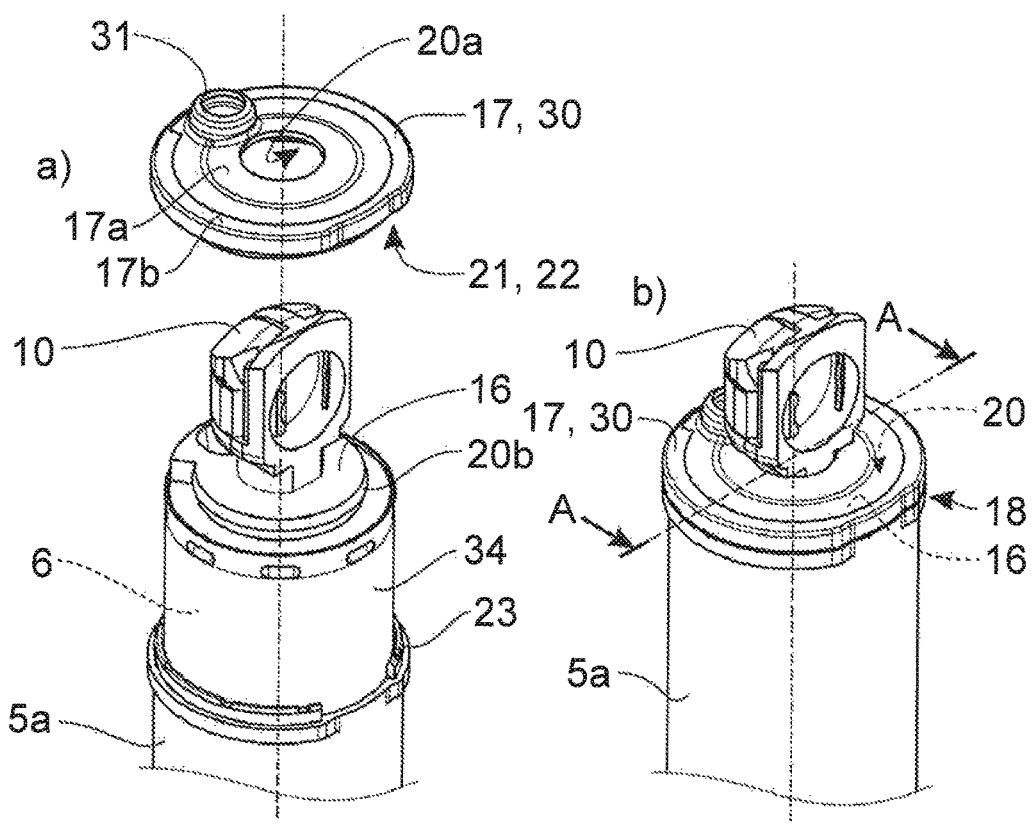
FIG. 4 shows individual detailed views of a spindle drive according to the proposal according to a second embodiment a) during assembly and b) after assembly.
Figure 4:
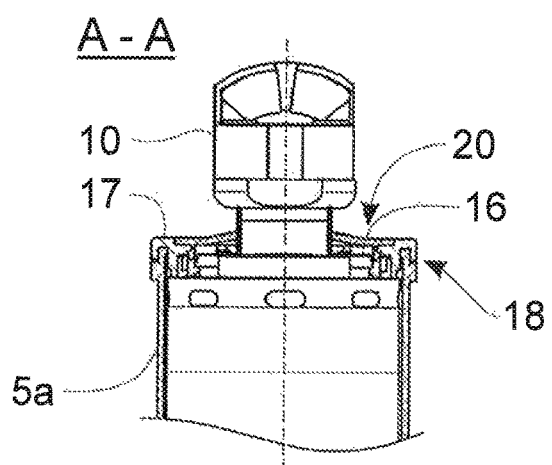

The housing collar 17 is, for example, in the same manner as the first housing pipe 5a, a plastic material component, for example a single-component or multi-component plastic material component 30, preferably, as in the embodiment according to FIG. 4, a two-component plastic material component. As shown in FIG. 4a), a radially inner portion 17a of the housing collar 17 is formed here by a soft component and a radially outer portion 17b of the housing collar 17 is formed by a hard component. Furthermore, there is provision in this instance for the portion 17a formed by the soft component to extend partially radially outwards. At locations where the portion 17a which is formed by the soft component extends radially outwards, the portion 17a further has here a cable feed-through 31 for an electric cable, for example, power cable. As a result of the resilient material thereof, the portion 17a is suitable for providing a seal between the housing collar 17 and drive connection 10 and/or between the housing collar 17 and cable.

As an example, there is further provision for the housing collar 17 on the whole or in a portion 17b, for example in the portion 17b formed by the hard component, to have a material which has a melting point which is equal to or higher than that of the material of the first housing pipe 5a, at least in the end portion 23 thereof.

The housing collar 17 may further, as in FIG. 3, have one or more axial and/or radial water discharge channels 32 which lead from the side of the housing collar 17 facing the second drive connection 11 and/or from the receiving space 21 to the side of the housing collar 17 facing away from the first housing pipe 5a or to the radial outer side of the housing collar 17. Furthermore, there may be provision between two circumferential portions 23a of the axial end portion 23 for a radial groove 23b to be provided in the end portion 23, for example in the tapering part-portion, which in the assembled state preferably forms a radial water discharge channel and/or is in fluid connection with a water discharge channel 32 of the housing collar 17.

The first coupling portion 18 of the spindle drive 1 and/or the receiving space 21 of the housing collar 17 may be radially spaced apart from the second coupling portion 20 of the spindle drive 1 or adjacent thereto. Additionally or alternatively, the first coupling portion 18 of the spindle drive 1 and/or the receiving space 21 of the housing collar 17 may be axially spaced apart from the second coupling portion 20 of the spindle drive 1 or adjacent thereto. In principle, however, an axial and/or radial overlapping of the two coupling portions 18, 20 is also conceivable.

In the embodiments according to FIGS. 3 and 4, there is provision for the axially secure coupling between the housing collar 17 and housing cover 16 in the second coupling portion 20 to be produced by means of an axially positive-locking and/or an axially non-positive-locking connection, for example a locking connection. In order to couple the housing collar 17 to the housing cover 16 in an axially secure manner, the housing collar 17 has in this instance at least one radially internal projection 20a and/or at least one radially internal recess and the housing cover 16 has at least one corresponding counter-piece 20b (FIG. 3).

Figure 5:
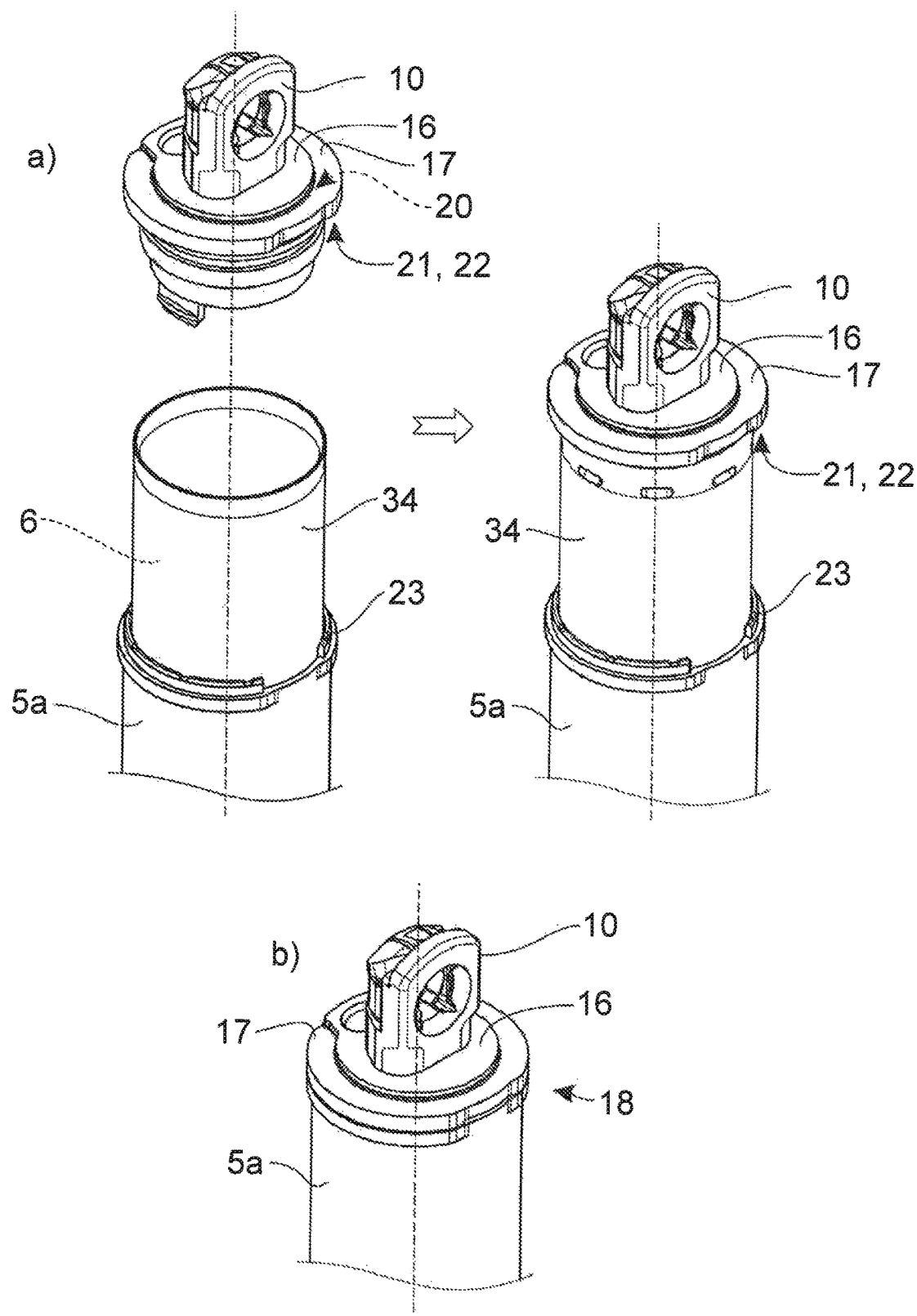
FIG. 5 shows individual detailed views of a spindle drive according to the proposal according to a third embodiment a) during assembly and b) after assembly.

As in FIG. 5, however, there may also be provision for the housing cover 16 to be connected to the housing collar 17 and/or the first drive connection 10 in a materially bonded manner or for the housing cover 16 to be configured in an integral manner with the housing collar 17 and/or the first drive connection 10. Such an integral portion is then preferably initially fixed to the housing of the motor casing 34 in an axially secure manner, for example by means of crimping, and only then is the materially bonded connection produced between the housing collar 17 and housing pipe 5a, for example by means of welding.

As already explained, a drive motor 6 is provided in the drive housing 5 in all embodiments. As an example, the housing cover 16 is a component of a motor casing 34 for receiving the drive motor 6. The drive motor 6 is thus in this instance supported in a motor casing 34 which can in addition also receive an intermediate transmission, a brake and/or a clutch. The axial end of the motor casing 34 facing the respective drive connection 10 is formed by the housing cover 16. The housing cover 16 may, however, also be a component of the drive motor 6 itself.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 spindle drive
2 adjustment element
3 boot lid
4 drive axis
5 drive housing
6 drive motor
7 spindle/spindle nut transmission
8 spindle
9 spindle nut
10 first drive connection
11 second drive connection
12 first drive train component
13 second drive train component
14 spindle nut pipe
15 helical spring
16 housing cover
17 housing collar
18 coupling portions
19 connection
20 second coupling portion
21 receiving space
22 axial recess
23 axial end portion
24 pipe end
25 axial stop element
26 counter-stop element
27 pipe wall
28 interruption
29 torsion prevention means
30 multi-component plastic material component
31 cable feed-through
32 water discharge channel
32 radial water discharge channels
33 region
34 motor casing
5a first housing pipe
5a instance two housing pipes
5a housing pipe
5a outer housing pipe
5b instance two housing pipes
5b inner housing pipe
17a inner portion
17b portion
17b outer portion
20a instance at least one radially internal projection
20b one corresponding counter-piece
22a inner walls
22b base
23a circumferential portions
23b radial groove
29a recess
29b corresponding counter-piece While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A spindle drive for an adjustment element of a motor vehicle, the spindle drive comprising:
    a tubular drive housing including a first housing pipe;
    a spindle/spindle nut transmission including a spindle and a spindle nut, the spindle nut in meshing engagement with the spindle nut, the spindle/spindle nut transmission configured to produce linear drive movements along an axially extending geometric drive axis;
    a first drive connection;
    a second drive connection, the first drive connection and at least one of the spindle and the spindle nut forms a first drive train component, and the second drive connection and the other of the at least one of the spindle and the spindle nut forms a second drive train component, wherein the first and second drive connection are collectively configured to discharge the drive movements;

a housing cover, the housing cover axially closes the drive housing in a region of the first drive connection and arranged in an axially secure manner relative to the first drive connection, wherein the first housing pipe is arranged in an axially secure manner relative to the first drive connection; and a housing collar, wherein the spindle drive includes a first coupling portion, in which the housing collar is materially bonded and connected to the first housing pipe, and a second coupling portion in which the housing collar is coupled to the housing cover in an axially secure manner;

wherein the housing collar in the first coupling portion of the spindle drive is materially bonded and connected to the first housing pipe by a weld or an adhesive, and, in the first coupling portion of the spindle drive, the housing collar defines at least one receiving space configured to receive melt of the first housing pipe produced by welding, or adhesive which has been introduced during the assembly by means of an adhesive bonding operation.

2. The spindle drive of claim 1, wherein the at least one receiving space is formed by an axial recess defined by a side of the housing collar facing the first housing pipe.

3. The spindle drive of claim 1, wherein the first housing pipe includes an axial end portion configured to form the melt produced by a welding operation and forms the melt.

4. The spindle drive of claim 2, wherein the axial recess is formed by at least one inner wall and a base of the side of the housing collar.

5. The spindle drive of claim 4, wherein at least one of the at least one inner wall and the base are connected to an axial end portion of the first housing pipe formed of hardened melt produced by welding.

6. The spindle drive of claim 1, wherein the first housing pipe includes a stop element and the housing collar includes a counter-stop element, the stop element and the counter-stop element are configured to cooperate to block an axial movement of the first housing pipe relative to the housing collar in a correct end position.

7. The spindle drive of claim 1, wherein in a non-assembled state a cross section of an axial end portion of the first housing pipe tapers towards an end of the pipe end.

8. The spindle drive of claim 1, wherein in a non-assembled state, a cross section of a pipe wall of the first housing pipe extending from an axial stop element and terminating at a pipe end includes a uniform portion and a tapered portion.

9. The spindle drive of claim 1, wherein the housing collar is an annularly circumferential component.

10. The spindle drive of claim 1, further comprising:
an anti-twist device disposed between the housing collar and the housing cover.

11. The spindle drive of claim 1, wherein the housing collar is formed of a plastic material.

12. The spindle drive of claim 1, wherein at least a portion of the housing collar is formed by a first material having a first melting point, the first housing pipe is formed by a second material different than the first material and having a second melting point, wherein the first melting point is equal to or greater than the second melting point.

13. The spindle drive of claim 1, wherein the housing collar defines a number of water discharge channels extending from a side of the housing collar facing the second drive connection.

14. The spindle drive of claim 1, wherein the first coupling portion of the spindle drive and/or the at least one receiving space of the housing collar is radially spaced apart from the second coupling portion of the spindle drive.

15. The spindle drive of claim 1, wherein the axially secure coupling between the housing collar and housing cover in the second coupling portion is produced by means of an axially locking connection.

16. The spindle drive of claim 1, wherein the at least one receiving space is formed by a circumferential groove.

17. The spindle drive of claim 1, wherein the first housing pipe includes an axial end portion, in an assembled state the axial end portion is at least partially adhesively bonded to the at least one receiving space.

18. The spindle drive of claim 1, wherein the housing collar is formed of a multi-component plastic.

* * * * *